(12) United States Patent
Urman et al.

(10) Patent No.: US 11,258,885 B2
(45) Date of Patent: Feb. 22, 2022

(54) FLEXIBLE PARSER IN A NETWORKING DEVICE

(71) Applicant: Mellanox Technologies, Ltd., Yokneam (IL)

(72) Inventors: Avi Urman, Yokneam Elit (IL); Lior Narkis, Petah-Tikva (IL); Noam Bloch, Bat Shlomo (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 160 days.

(21) Appl. No.: 16/708,470

(22) Filed: Dec. 10, 2019

(65) Prior Publication Data

US 2021/0176345 A1 Jun. 10, 2021

(51) Int. Cl.
*H04L 29/06* (2006.01)
*G06F 9/455* (2018.01)
(Continued)

(52) U.S. Cl.
CPC .......... *H04L 69/22* (2013.01); *G06F 9/45558* (2013.01); *H04L 12/4641* (2013.01);
(Continued)

(58) Field of Classification Search
CPC ..... H04L 69/22; H04L 12/4641; H04L 41/24; H04L 67/2842; H04L 43/02; H04L 47/2483; H04L 49/9042; H04L 69/04; H04L 12/462; H04L 12/4633; H04L 29/06612; H04L 45/00; H04L 49/00;
(Continued)

(56) References Cited

U.S. PATENT DOCUMENTS 5,394,394 A 2/1995 Crowther et al.
6,308,219 B1 10/2001 Hughes
(Continued)

OTHER PUBLICATIONS

Gibb et al., "Design Principles for Packet Parsers", ACM/IEEE Symposium on Architectures for Networking and Communications Systems (ANCS), pp. 1-12, Oct. 2013.
(Continued)

*Primary Examiner* — Pankaj Kumar
*Assistant Examiner* — Eric Phu
(74) *Attorney, Agent, or Firm* — Kligler & Associates Patent Attorneys Ltd (57) ABSTRACT

One embodiment includes a network device, including hardware parsers to receive data of a header section of a packet, the header section including respective headers, parser configuration registers to store a default parsing configuration data set, wherein at least one of the hardware parsers is configured to parse at least one of the headers responsively to the default parsing configuration data set, yielding first parsed data, a packet processing engine to select a selected parsing configuration data set from a selection of parsing configuration data sets responsively to the first parsed data, cause loading of the selected parsing configuration data set into the parser configuration registers, and wherein ones of the hardware parsers are configured to parse respective ones of the headers responsively to the selected parsing configuration data set, yielding second parsed data, and process the packet responsively to the second parsed data.

22 Claims, 6 Drawing Sheets

(51) Int. Cl.
  *H04L 12/46* (2006.01)
  *H04L 12/24* (2006.01)
  *H04L 29/08* (2006.01)
  *H04L 69/22* (2022.01)
  *H04L 41/00* (2022.01)
  *H04L 67/568* (2022.01)

(52) U.S. Cl.
  CPC .......... *H04L 41/24* (2013.01); *H04L 67/2842* (2013.01); *G06F 2009/45595* (2013.01)

(58) Field of Classification Search
  CPC ..... H04L 67/1097; H04L 67/00; H04L 67/16; H04L 63/06; G06F 9/45558; G06F 2009/45595; G06F 17/30; G06F 12/45595; G06F 17/147; G06F 16/9574; G06F 12/0802; G06F 12/0866; H04W 28/06
  USPC ........................................................ 370/474
  See application file for complete search history.

(56) References Cited

U.S. PATENT DOCUMENTS

| | | |
|---|---|---|
| 6,356,951 B1 | 3/2002 | Gentry, Jr. |
| 6,788,680 B1 | 9/2004 | Perlman et al. |
| 7,333,484 B2 | 2/2008 | Henderson et al. |
| 7,623,468 B2 | 11/2009 | Panigrahy et al. |
| 7,921,046 B2 | 4/2011 | Parsons et al. |
| 8,161,468 B2 | 4/2012 | Todd |
| 8,694,448 B2 | 4/2014 | Mandelbaum et al. |
| 8,705,533 B1 | 4/2014 | Venkatraman et al. |
| 10,015,090 B2 | 7/2018 | Arad et al. |
| 2003/0043848 A1 | 3/2003 | Sonksen |
| 2004/0081101 A1 | 4/2004 | Bennett |
| 2004/0088430 A1 | 5/2004 | Busi et al. |
| 2005/0089016 A1 | 4/2005 | Zhang et al. |
| 2007/0276952 A1 | 11/2007 | Mitchell |
| 2008/0025308 A1 | 1/2008 | Morgan et al. |
| 2008/0095149 A1 | 4/2008 | Dai |
| 2011/0149895 A1 | 6/2011 | Sala et al. |
| 2013/0022128 A1* | 1/2013 | Symes ................. G06F 17/147 375/240.18 |
| 2013/0215906 A1 | 8/2013 | Hidai |
| 2015/0081726 A1 | 3/2015 | Izenberg |
| 2015/0156288 A1* | 6/2015 | Lu ........................ H04L 69/22 370/392 |
| 2015/0172189 A1 | 6/2015 | Pitchai et al. |
| 2015/0256456 A1 | 9/2015 | Previdi et al. |
| 2015/0341265 A1 | 11/2015 | Basso et al. |
| 2016/0094667 A1* | 3/2016 | Jani ........................ H04L 67/16 709/202 |
| 2016/0139892 A1 | 5/2016 | Atreya et al. |
| 2016/0197852 A1 | 7/2016 | Hutchison et al. |
| 2017/0064047 A1 | 3/2017 | Bosshart |
| 2017/0286292 A1 | 10/2017 | Levy et al. |
| 2018/0288197 A1* | 10/2018 | Izenberg ................. G06F 17/30 |
| 2018/0288614 A1* | 10/2018 | Zaks ...................... H04L 63/06 |
| 2019/0004701 A1* | 1/2019 | Guim Bernat ......... H04L 69/22 |
| 2019/0073719 A1 | 3/2019 | Parsons et al. |
| 2019/0132421 A1 | 5/2019 | Fedyak |
| 2019/0182366 A1 | 6/2019 | Kfir et al. |
| 2019/0215384 A1 | 7/2019 | Kfir et al. |

OTHER PUBLICATIONS

Deering et al., "Internet Protocol, Version 6 (IPv6) Specification", Request for Comments: 2460, pp. 1-39, Dec. 1998.
University of Southern California, "Darpa Internet Program", Protocol Specification, Request for comments 791, pp. 1-50, Sep. 1981.
Cheng et al., "Telco Distributed DC with Transport Protocol Enhancement for 5G Mobile Networks", working papers, Karlstad University, Faculty of Health, Science and Technology, pp. 1-58, Dec. 2017.
EP Application #20213217.1 Search Report dated May 4, 2021.

* cited by examiner

FLEXIBLE PARSER IN A NETWORKING DEVICE

FIELD OF THE INVENTION

The present invention relates to network equipment, and in particular, but not exclusively to, parsers.

BACKGROUND

As a first step in deciding how to forward a given packet, a router (or other network device) generally parses the header section of packet, i.e., identifies the fields in the header section that contain relevant information and extracts the information from these fields that is to be used by steering logic. This sort of header parsing, along with other packet processing operations, is generally carried out by hardware logic and therefore lacks the flexibility of software-driven processing. Handling new or custom packet headers and/or options, for example, options in the IPv4 header, can be particularly challenging in this context, since in contrast to the fixed structure of the basic header, the new or custom headers and choice of optional records and their order can vary from packet to packet. Similar problems arise in parsing of other protocol headers that can include variable options, such as the TCP header.

US20190215384 of Kfir, et al., describes a communication apparatus including multiple interfaces configured to be connected to a network so as to receive and transmit data packets having respective packet headers that includes a basic header record and one or more optional records. Parsing instructions specify one or more types of the optional records and indicate, for each specified type, an offset within an optional record of the specified type. Upon receiving each packet, routing logic parses the basic header record in the packet, parses the one or more optional records so as to identify any optional records of the one or more specified types, extracts header data from the identified optional records at the offset indicated for the specified type, and processes and forwards the data packets via the interfaces to the network in accordance with information parsed from the basic header record and the extracted header data.

SUMMARY

There is provided in accordance with an embodiment of the present disclosure, a network device, including hardware parsers coupled to receive data of a header section of a packet, the header section including respective headers, parser configuration registers configured to store a default parsing configuration data set, wherein at least one of the hardware parsers is configured to parse at least one of the headers responsively to the default parsing configuration data set, yielding first parsed data, a packet processing engine coupled to the hardware parsers, and configured to select a parsing configuration data set from a selection of parsing configuration data sets responsively to the first parsed data, cause loading of the selected parsing configuration data set into the parser configuration registers, and wherein ones of the hardware parsers are configured to parse respective ones of the headers responsively to the selected parsing configuration data set, yielding second parsed data, and process the packet responsively to the second parsed data.

Further in accordance with an embodiment of the present disclosure, the device includes an interface configured as an egress port, wherein the packet processing engine is configured to forward the packet via the egress port to a network node in a packet data network responsively to the second parsed data.

Still further in accordance with an embodiment of the present disclosure the packet processing engine is configured to change data in the header section responsively to the second parsed data.

Additionally in accordance with an embodiment of the present disclosure, the device includes a cache memory configured to cache the selection of parsing configuration data sets including the selected parsing configuration data set, the packet processing engine being configured to cause loading of the selected parsing configuration data set from the cache memory into the parser configuration registers.

Moreover in accordance with an embodiment of the present disclosure the hardware parsers are configured to parse header sections of respective virtual network functions (VNFs) having respective header parsing schemes responsively to respective ones of the selection of parsing configuration data sets, the packet processing engine is configured to select the selected parsing configuration data set from the selection of parsing configuration data sets responsively to the first parsed data being identified as associated with one of the VNFs, ones of the hardware parsers are configured to parse respective ones of the headers in accordance with one of the header parsing schemes of the one VNF responsively to the selected parsing configuration data set, and the packet processing engine is configured to forward the packet responsively to the second parsed data.

Further in accordance with an embodiment of the present disclosure respective ones of the VNFs include at least one virtual machine.

Still further in accordance with an embodiment of the present disclosure the packet processing engine is configured to forward the packet to a virtual machine responsively to the second parsed data.

Additionally, in accordance with an embodiment of the present disclosure the packet processing engine is configured to identify the one VNF from a network address included in the first parsed data.

Moreover, in accordance with an embodiment of the present disclosure respective ones of the hardware parsers are configured to successively parse the header section respective offsets in the header section, ones of the hardware parsers being configured to compute the respective offsets responsively to the selected parsing configuration data and the header section.

Further in accordance with an embodiment of the present disclosure the selected parsing configuration data set includes for respective ones of the hardware parsers a next header offset of a next header identification (ID) in the header section, and a next protocol table linking next header IDs with next protocols, wherein a first one of the hardware parsers is coupled to retrieve the next header offset for the first hardware parser from the selected parsing configuration data set in the parser configuration registers, retrieve the next header ID, which is located in the header section at the next header offset, from the header section responsively to the retrieved next header offset, retrieve an identification of a next protocol to be processed from the next protocol table for the first hardware parser from the selected parsing configuration data set in the parser configuration registers responsively to the retrieved next header ID, and transfer the header section to a second one of the hardware parsers, which is configured to parse the header section in accordance with the next protocol.

Still further in accordance with an embodiment of the present disclosure the selected parsing configuration data set includes for respective ones of the hardware parsers, at least one data extraction offset in the header section for which data is to be extracted, a first one of the hardware parsers being configured to extract data from the header section responsively to the at least one data extraction offset of the first hardware parser in the selected parsing configuration data set.

There is also provided in accordance with another embodiment of the present disclosure, a network method, including receiving data of a header section of a packet, the header section including respective headers, storing a default parsing configuration data set in parser configuration registers, parsing at least one of the headers responsively to the default parsing configuration data set, yielding first parsed data, selecting a selected parsing configuration data set from a selection of parsing configuration data sets responsively to the first parsed data, causing loading of the selected parsing configuration data set into the parser configuration registers, parsing respective ones of the headers responsively to the selected parsing configuration data set, yielding second parsed data, and processing the packet responsively to the second parsed data.

Additionally, in accordance with an embodiment of the present disclosure, the method includes forwarding the packet via an egress port to a network node in a packet data network responsively to the second parsed data.

Moreover, in accordance with an embodiment of the present disclosure, the method includes changing data in the header section responsively to the second parsed data.

Further in accordance with an embodiment of the present disclosure, the method includes caching the selection of parsing configuration data sets including the selected parsing configuration data set in a cache memory, and cause loading of the selected parsing configuration data set from the cache memory into the parser configuration registers.

Still further in accordance with an embodiment of the present disclosure, the method includes parsing header sections of respective virtual network functions (VNFs) having respective header parsing schemes responsively to respective ones of the selection of parsing configuration data sets, selecting the selected parsing configuration data set from the selection of parsing configuration data sets responsively to the first parsed data being identified as associated with one of the VNFs, parsing respective ones of the headers in accordance with one of the header parsing schemes of the one VNF responsively to the selected parsing configuration data set, and forwarding the packet responsively to the second parsed data.

Additionally, in accordance with an embodiment of the present disclosure respective ones of the VNFs include at least one virtual machine.

Moreover, in accordance with an embodiment of the present disclosure, the method includes forwarding the packet to a virtual machine responsively to the second parsed data.

Further in accordance with an embodiment of the present disclosure, the method includes identifying the one VNF from a network address included in the first parsed data.

Still further in accordance with an embodiment of the present disclosure, the method includes successively parsing the header section respective offsets in the header section, and computing the respective offsets responsively to the selected parsing configuration data set and the header section.

Additionally in accordance with an embodiment of the present disclosure the selected parsing configuration data set includes a next header offset of a next header identification (ID) in the header section, and a next protocol table linking next header IDs with next protocols, the method further including retrieving the next header offset from the selected parsing configuration data set, retrieving the next header ID, which is located in the header section at the next header offset, from the header section responsively to the retrieved next header offset, retrieving an identification of a next protocol to be processed from the next protocol table from the selected parsing configuration data set responsively to the retrieved next header ID, and parsing the header section in accordance with the next protocol.

Moreover in accordance with an embodiment of the present disclosure the selected parsing configuration data set includes at least one data extraction offset in the header section for which data is to be extracted, the method further including extracting data from the header section responsively to the at least one data extraction offset of the first hardware parser in the selected parsing configuration data set.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

As previously mentioned, header parsing, along with other packet processing operations, is generally carried out by hardware logic and therefore lacks the flexibility of software-driven processing. Handling new or custom packet headers and/or options can be particularly challenging in this context, since in contrast to the fixed structure of the basic header, the new or custom headers and choice of optional records and their order can vary from packet to packet.

One possible response to this difficulty, which is commonly adopted in simpler devices, is to parse only the basic header and skip over the options and other new or custom formats. Even if parsing all the headers is not necessary in order to comply with the relevant standards, some network functions, such as network security and route monitoring, may not be supported if these headers are skipped.

In the alternative, the device can be configured to process the required header formats. This approach, however, requires that the device has sufficient memory resources to hold all of the header data that the parser extracts from packets in transit through the device. These demands also increase the size and cost of the device.

Embodiments of the present invention solve the above problems by providing a network device including flexible hardware parsers. The flexible hardware parsers are configured to parse headers of a header section based on using parsing configuration data stored in registers. The parsing configuration data may be updated as needed thereby providing flexibility so that the flexible hardware parsers may be configured to parse different headers of different lengths and formats even after the hardware of the network device has been manufactured.

The header section may be passed successively to different hardware parsers which parse different headers of the header section. The order of the passing of the header section among the different hardware parsers may be configured using the parsing configuration data. The parsing configuration data may include data which is used by the flexible hardware parsers to determine a length of each header, a new header to be processed after the current header and therefore which hardware parser should next receive the header section for parsing, and which fields of the header should be extracted, for example.

The network device may also include native hardware parsers which may work alongside the flexible hardware parsers. The native hardware parsers are generally not configurable and simply parse the header type that they were designed to parse. For example, there may be a native hardware parser for parsing Media Access Control (MAC) headers and a flexible hardware parser for parsing VXLAN headers.

Therefore, the respective flexible hardware parsers of the network device may be configured using the parsing configuration data set to parse headers of different respective protocols.

The network device may need to process different types of packets according to different parsing schemes. For example, a network interface card may serve a server hosting multiple virtual machines (VMs). Each of the VMs may use a custom parsing scheme. The header types of the different schemes may exceed the number of flexible hardware parsers in the network device.

Embodiments of the present invention solve the above problem by storing different parsing configuration data sets in memory. The parsing configuration data sets may be dynamically loaded into the registers used by the flexible hardware parsers according to the type of packet being processed. For example, a packet destined for VM1 is received by the network device. The header section is parsed according to a default parsing configuration data set, yielding parsing data (e.g., a MAC address), which indicates that the packet is destined for VM1. The parsing configuration data set for VM1 is loaded into the registers and the header section is reparsed according to the loaded parsing configuration data set for VM1. The packet is processed using the data from the second parse including steering the packet towards VM1. Therefore, a first parse may be performed according to the default parsing configuration data set followed by a second parse performed according to a selected parsing configuration data set.

In some embodiments, the hardware parsers of the network device receive data of a header section including respective headers. Parser configuration registers store a default parsing configuration data set. At least one of the hardware parsers parses at least one of the headers responsively to the default parsing configuration data set, yielding first parsed data. A packet processing engine selects a parsing configuration data set from a selection of parsing configuration data sets responsively to the first parsed data. The packet processing engine causes loading of the selected parsing configuration data set into the parser configuration registers. At least some of the hardware parsers parse respective ones of the headers responsively to the selected parsing configuration data set, yielding second parsed data. The packet processing engine processes the packet responsively to the second parsed data, which may include forwarding the packet via an egress port to a network node in a packet data network responsively to the second parsed data, and/or changing data in the header section responsively to the second parsed data, and/or forwarding to another device or node.

In some embodiments, to allow quick loading of the configuration data into the registers, the network device includes a cache memory to cache the selection of parsing configuration data sets for loading therefrom into the registers.

System Description

Figure 1:
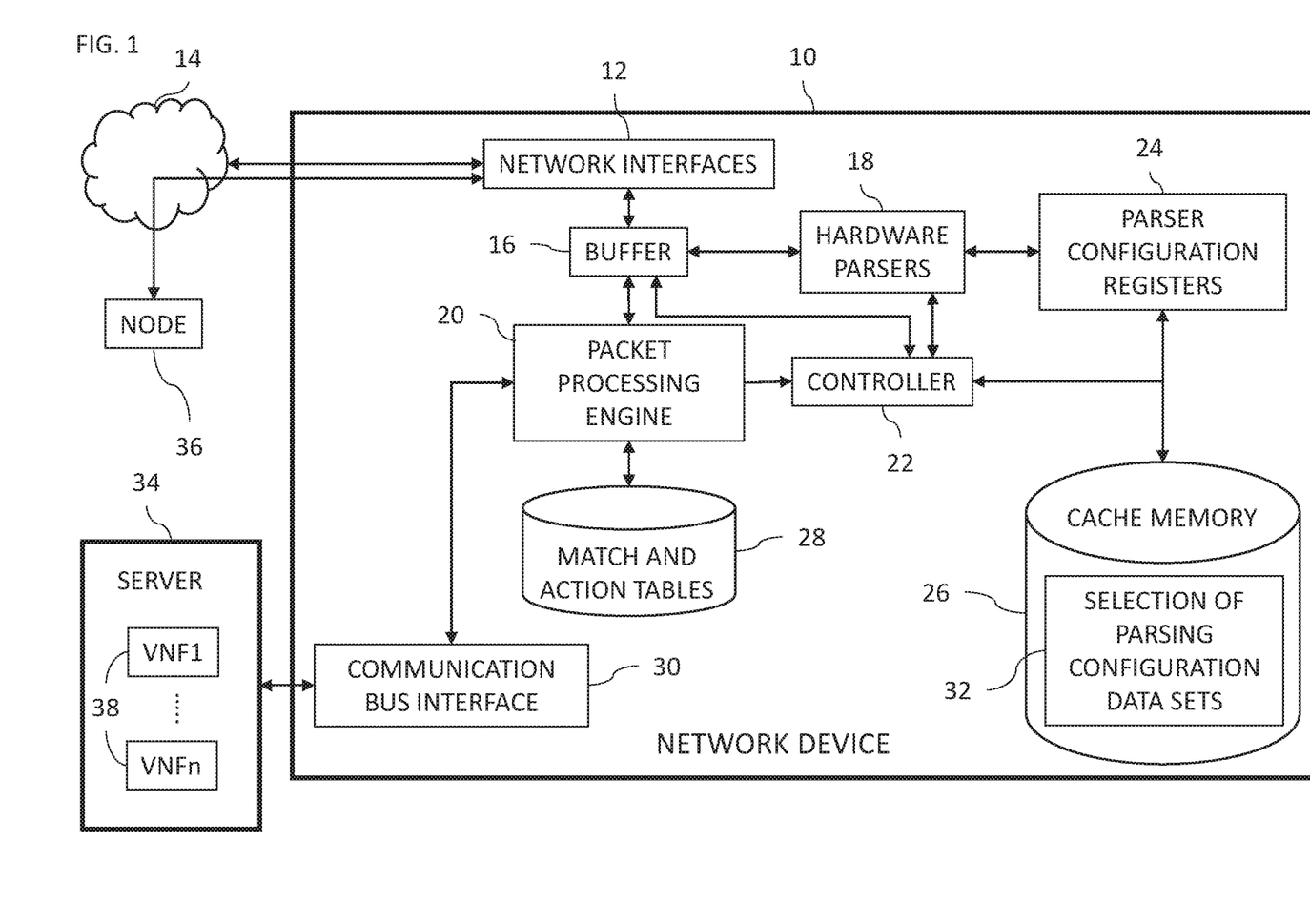
FIG. 1 is a block diagram view of a network device constructed and operative in accordance with an embodiment of the present invention.

Reference is now made to FIG. 1, which is a block diagram view of a network device 10 constructed and operative in accordance with an embodiment of the present invention. The network device 10 may be any suitable device, for example, but not limited to, a router, a switch, or a network interface card. The network device 10 includes at least one network interface 12 configured to operate as at least one ingress port and at least one egress port for receiving packets from, and sending packets to, a packet data network 14.

The network device 10 also includes a buffer 16, hardware parsers 18, a packet processing engine 20, a controller 22, parser configuration registers 24, a cache memory 26, match and action tables 28, and optionally a communication bus interface 30.

Packets received by the network interface 12 are stored in the buffer 16. Header sections of the received packets are parsed by the hardware parsers 18 which are controlled by the controller 22, typically under instruction of the packet processing engine 20. At least some of the hardware parsers 18 parse the header sections according to data loaded into the parser configuration registers 24. The cache memory 26 caches a selection of parsing configuration data sets 32, which are selectively loaded into the parser configuration registers 24 from the cache memory 26 by the controller 22 under instruction from the packet processing engine 20.

The hardware parsers 18 parse the various headers included in the header sections of packets and may optionally extract additional information from the header sections. The parsed information is stored in the buffer 16 for retrieval by the packet processing engine 20 and/or sent to the packet processing engine 20. In some embodiments, the header section is also sent by the hardware parsers 18 to the packet processing engine 20. Operation of the hardware parsers 18 and the selection of parsing configuration data sets 32 are described in more detail below with reference to FIGS. 2-6.

The packet processing engine 20 uses the match and action tables 28 to determine how each packet should be processed according to the parsed information generated by the hardware parsers 18. The match and action tables 28 include data to match to the parsed information, and associated actions to be performed when a match is found. The data to be matched may include any field from the packet, for example, MAC or IP addresses, security information, Transmission Control Protocol (TCP) data, User Datagram Protocol (UDP) data, Virtual Extensible Local Area Network (VXLAN) data, Generic Routing Encapsulation (GRE) data, and Generic Network Virtualization Encapsulation (GENEVE) data, by way of example only. The actions may include any suitable action or actions per match, for example, but not limited to, reparsing the header section using a different parsing configuration set, sending the packet to a given network node 36 via the packet data network 14, sending the packet to a server 34 connected to the network device 10 via the communication bus interface 30, amending the header section, adding a new header, and/or removing a header, e.g., VLAN or Multi-Protocol Label Switching (MPLS). The communication bus interface 30 may operate in accordance with any suitable protocol, for example, but not limited to, PCIe (peripheral component interconnect express) interface standard.

For example, if a MAC address in the header section is matched to a given MAC address then the packet is to be reparsed by the hardware parsers 18 after the parser configuration registers 24 are loaded with parsing configuration data set A. In this example, the packet processing engine 20 instructs the controller 22 to load parsing configuration data set A from the cache memory 26 and send the header section, or a link to the header section in the buffer 16, to the hardware parsers 18 so that the header section can be reparsed according to parsing configuration data set A. By way of another example, if the parsed information includes data B, then the packet is forwarded to server C via the communication bus interface 30. By way of an additional example, if the parsed information includes data D, then the header section is amended. By way of yet another example, if the parsed information includes data E, then the packet is sent back to the packet data network 14 on port F. One or more actions may be associated with a single match.

The functionality of the packet processing engine 20 is also described with reference to FIG. 6. In practice, some or all of the functions of the packet processing engine 20 may be combined in a single physical component or, alternatively, implemented using multiple physical components. These physical components may comprise hard-wired or programmable devices, or a combination of the two. In some embodiments, at least some of the functions of the packet processing engine 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The functionality of the controller 22 is also described with reference to FIG. 6. In practice, some or all of the functions of the controller 22 may be combined in a single physical component or, alternatively, implemented using multiple physical components. These physical components may comprise hard-wired or programmable devices, or a combination of the two. In some embodiments, at least some of the functions of the controller 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

In some embodiments, the functionality of the controller 22 may be implemented in the packet processing engine 20.

In the example of FIG. 1, the network device 10 may be implemented as a network interface card for the server 34. The server 34 may include multiple virtual network functions (VNFs) 38. Each virtual network function 38 may include one or more virtual machines (VMs). A hypervisor running on the server 34 may implement the VMs. In some examples, different VMs may be operated for different customers, each having their own parsing and packet processing requirements. Each customer may want to be able to configure the hardware parsers 18 of the network device 10 according to their own requirements. However, as the number of hardware parsers 18 is limited, the hardware parsers 18 cannot be programed with a single parsing configuration data set to parse the data of the different customers according to the customer needs. When a packet is received in the buffer 16, the hardware parsers 18 parse at least some of the header section according to a default parsing configuration data set. The packet processing engine 20 uses the match and action tables 28 to determine what action should be performed. One action may include reparsing the header section using the specific parsing configuration data set for the customer or VM associated with the header section. For example, a MAC address included in the header section may indicate the VM associated with this header section.

Figure 2:
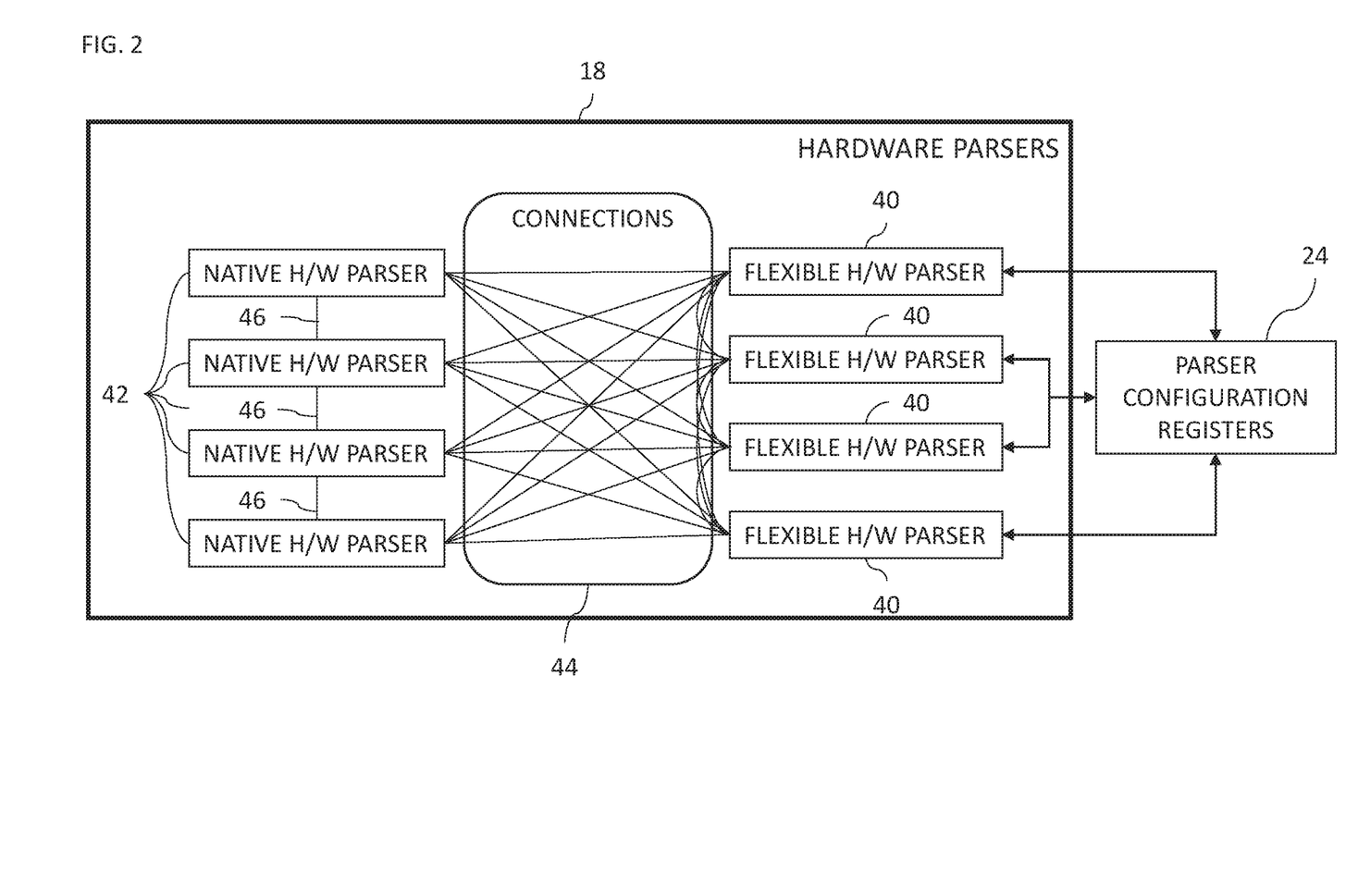
FIG. 2 is a block diagram view of hardware parsers in the device of FIG. 1 operative in accordance with an embodiment of the present invention.

Reference is now made to FIG. 2, which is a block diagram view of the hardware parsers 18 in the device 10 of FIG. 1 operative in accordance with an embodiment of the present invention. The hardware parsers 18 include flexible hardware parsers 40 and optionally one or more native hardware parsers 42 as shown in FIG. 2. The flexible hardware parsers 40 are configured to parse header section data according to the data in the parser configuration registers 24. The flexible hardware parsers 40 are therefore reconfigurable even after the network device 10 has been manufactured. The native hardware parsers 42 on the other hand are not generally reconfigurable after the network device 10 has been manufactured. For example, one of the native hardware parsers 42 may be configured to parse a MAC header, another one of the native hardware parsers 42 may be configured to parse a Multi-Protocol Label Switching (MPLS) header, while another one of the native hardware parsers 42 may be configured to parse a User Datagram Protocol (UDP) header. The native hardware parsers 42 may be connected together in a fixed order as shown in FIG. 2 so that when one of the native hardware parsers 42 finishes parsing part of a header section (e.g., one of the headers), the header section is passed to the next native hardware parser 42 in line via one of connections 46. Additionally, or alternatively, each of the native hardware parsers 42 may be connected via connections 44 to one or more (typically to each) of the flexible hardware parsers 40. For example, after one of the native hardware parsers 42 finishes parsing part of a header section (e.g., one of the headers), the header section is passed to one of the flexible hardware parsers 40 via one of the connections 44. The flexible hardware parsers 40 are also connected to each other via the connections 44 so that when one of the flexible hardware parsers 40 finishes parsing part of a header section (e.g., one of the headers), the header section is passed to another one of the flexible hardware parsers 40 via one of the connections 44. The connections 44 between the hardware parsers 40, 42 (i.e., which parser 40, 42 is to receive the header section for processing next) may be configured using the data in the parser configuration registers 24. For example, an identification of the connection 44 used to send the header section to the next parser 40, 42 may be included in the data stored in the parser configuration registers 24. For a given configuration of the hardware parsers 40, 42 some of the connections 44 may be enabled while others are disabled. The configuration of the connections 44 is described in more detail with reference to FIGS. 3-5.

In some embodiments, one of the flexible hardware parsers 40 may be configured as a zero-length parser, described in more detail below with reference to FIG. 4, whereby the flexible hardware parser 40 is used to pass the header section between two native hardware parsers 42 without actually parsing any of the header section.

The order of passing the header section between the hardware parsers 40, 42 is determined by the order of the headers in the header section. For example, if the header section includes, a MAC header, followed by an Internet Protocol (IP) header, following by a UDP header, followed by a Virtual Extensible Local Area Network (VXLAN) header, the hardware parsers 40, 42 and their connections 44 are configured to parse the MAC header, followed by the IP header, followed by the UDP header, followed by the VXLAN header. In some embodiments, the header section may include more than one of a particular header protocol. For example, when tunneling is employed, there may be two MAC headers. In such a case, both MAC headers may be parsed using the same flexible hardware parser 40 or native hardware parser 42 at different times in the parsing process. Alternatively, the MAC headers may each be parsed by different ones of the hardware parsers 40, 42. Tunneling is described in more detail with reference to FIG. 4 below.

Figure 3:
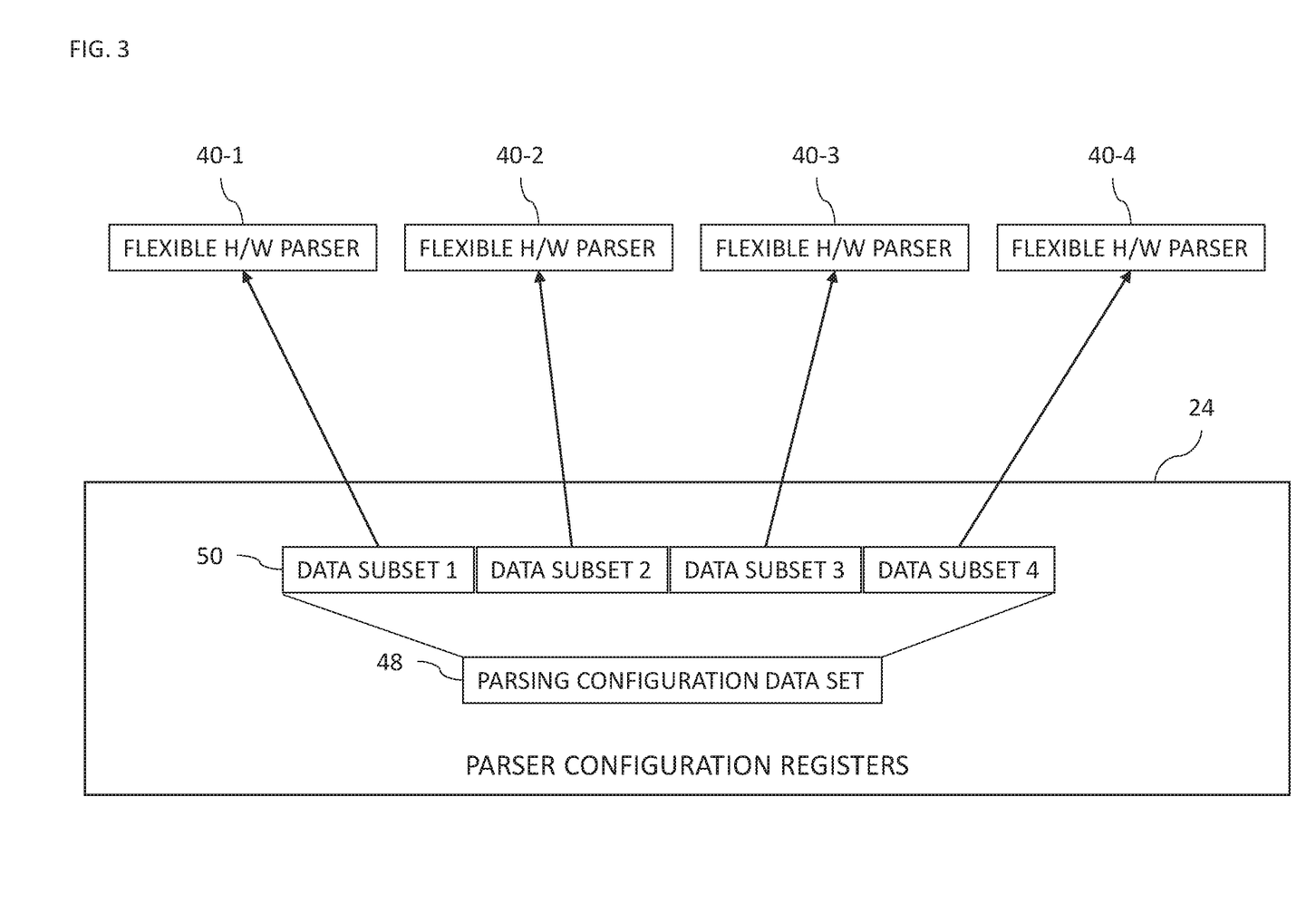
FIG. 3 is a block diagram view of hardware parsers accessing data from a parsing configuration data set in accordance with an embodiment of the present invention.

Reference is now made to FIG. 3, which is a block diagram view of flexible hardware parsers 40 accessing data from a parsing configuration data set 48 in accordance with an embodiment of the present invention. FIG. 3 shows that the parsing configuration data set 48 is currently loaded into the parser configuration registers 24. The parsing configuration data set 48 includes a plurality of data subsets 50. Respective ones of the data subsets 50 are used to configure respective ones of the flexible hardware parsers 40. For example, the flexible hardware parser 40-1 is configured according to the data in data subset 1, the flexible hardware parser 40-2 is configured according to the data in data subset 2, the flexible hardware parser 40-3 is configured according to the data in data subset 3, and the flexible hardware parser 40-4 is configured according to the data in data subset 4.

Figure 4:
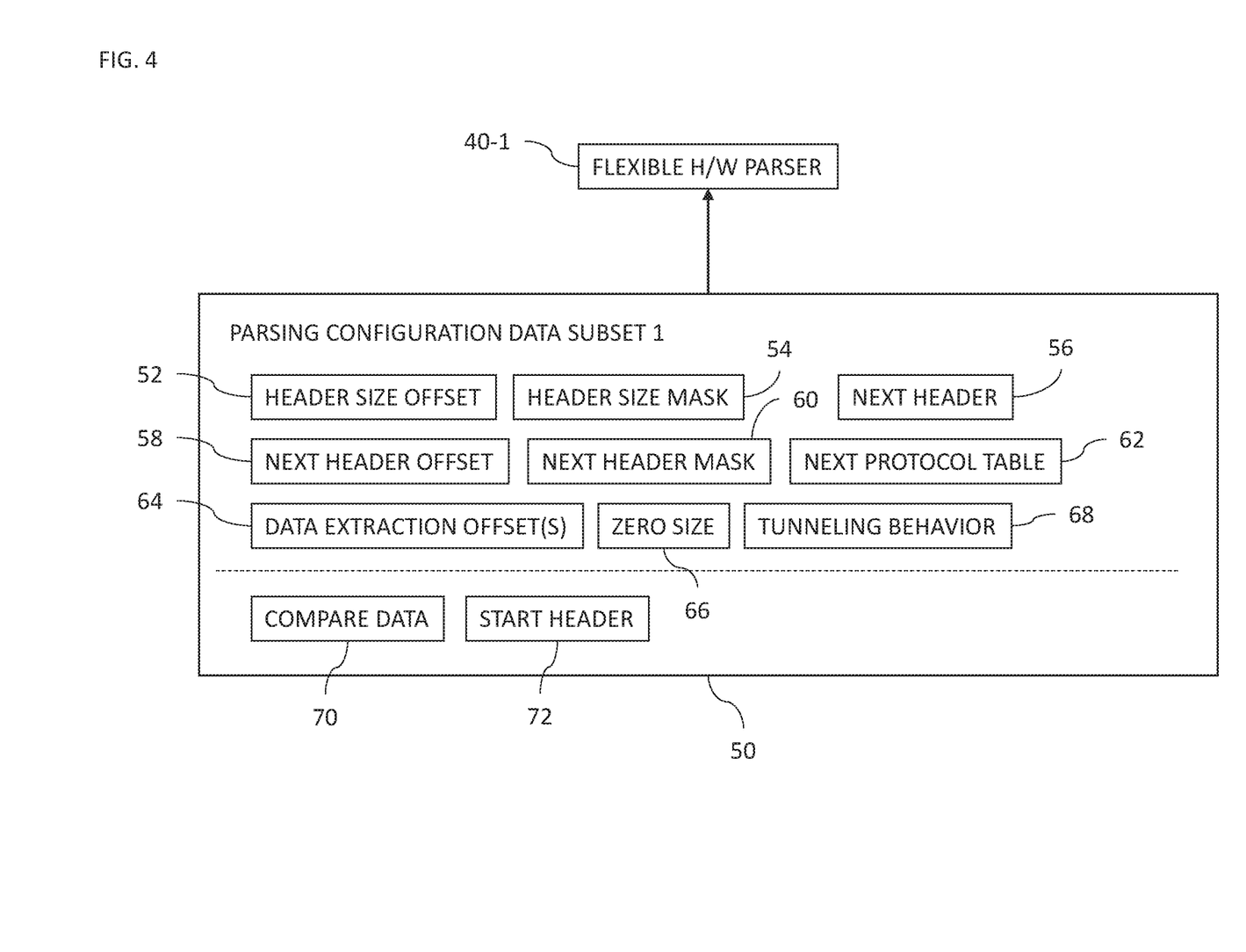
FIG. 4 is a block diagram view illustrating fields in the parsing configuration data set of FIG. 3 in accordance with an embodiment of the present invention.

Reference is now made to FIG. 4, which is a block diagram view illustrating fields in the parsing configuration data subset 1 (reference numeral 50) of FIG. 3 in accordance with an embodiment of the present invention.

The data subset 50 may include a header size field (not shown) which gives the size of the headers that the flexible hardware parser 40-1 is configured to parse. This field may be useful when the headers parsed by the flexible hardware parser 40-1 are all the same length. Alternatively, the data subset 50 may include a header size offset field 52, which provides the offset of a "header size field" in the header, which the flexible hardware parser 40-1 is configured to parse. The "header size field" in the header gives the size of the header. The header size offset is not the absolute offset with respect to the beginning of the header section, but the relative offset from the beginning of the current header being parsed. The data subset 50 may optionally include a header size mask field 54 giving the number of bits included in the header size field in the header.

The data subset 50 may include a next header field 56 which gives an identification of the next header to be parsed in the header section. This field may be useful when there is only one option for the next header from the current one. Alternatively, the data subset 50 may include a next header offset field 58 and a next header mask field 60. The next header offset field 58 provides the relative offset of a next header identification field in the header giving the identification of the next header to be parsed in the header section. The data subset 50 may also include a next protocol table 62, which maps next header identifications with protocols. The protocol value found in the next protocol table 62 may provide the identification of one of the connections 44 (FIG. 2) connecting the current flexible hardware parser 40 with another hardware parser 40, 42. The "next header" fields are described in more detail with reference to FIG. 5. The next header mask field 60 provides the number of bits included in the next header identification field in the header.

The data subset 50 may include a data extraction offset field 64, which gives the offset(s) in the header of data to be extracted. The data subsets 50 may include a data extraction mask field which provides the number of bits to be extracted at the offset(s).

The data subset 50 may include a zero-size field 66, which indicates if the flexible hardware parser 40-1 is a zero-size parser. As mentioned above a zero-size parser may be used to pass the header section between two native hardware parsers 42 (or any two parsers) without proceeding any further into the packet.

The data subset 50 may include a tunneling behavior field 68. As mentioned above, the same parser 40, 42 may parse more than one header of the same type from a header section when tunneling is used. When a tunneled header (inner header) is to be processed a tunneling bit is sent with the header section to the next hardware parser 40, 42. When the next parser 40, 42 receives the header section with the tunneling bit, the parser 40, 42 processes the header according to tunneling which means that data produced from the parsing process (e.g., offset and extracted data) are saved to a location in the buffer 16 defined in the tunneling behavior field 68.

If the data subset 50 used by one of the flexible hardware parsers 40 does not include next header information or the header does not include next header information, parsing is stopped (and the header section is not passed to another hardware parser 40, 42) and further processing of the packet is passed to the packet processing engine 20 (FIG. 1).

As previously mentioned, parsing performed by native hardware parsers 42 is not configured by the parsing configuration data set stored in the parser configuration registers 24. However, in order to enable one of the native hardware parsers 42 to pass the header section to one of the flexible hardware parsers 40, the data subsets 50 include a compare data field 70 and a start header field 72. Each native hardware parser 42 includes a multiplexer (not shown) which receives the header section and the offset computed by that native hardware parser 42 from that native hardware parser 42 and routes the header section and the offset to the next flexible hardware parser 40 via one of the connections 44. The multiplexer selects the relevant connection 44 as follows. The multiplexer retrieves a next header identification from the header processed by that native hardware parser 42. The multiplexer searches the compare data field 70 of the data subsets 50 until a match is found. A match means that the multiplexer should send the header section and offset to the flexible hardware parser 40 associated with that data subset 50 in which the match was found. The multiplexer then retrieves the protocol value found in the start header field 72, of that data subset 50 in which the match was found, providing the identification of one of the connections 44 (FIG. 2) connecting to the flexible hardware parser 40 associated with that data subset 50. If the multiplexer cannot find a match to the next header identification in any of the data subsets 50 parsing is stopped and further processing of the packet is passed to the packet processing engine 20 (FIG. 1).

Figure 5:
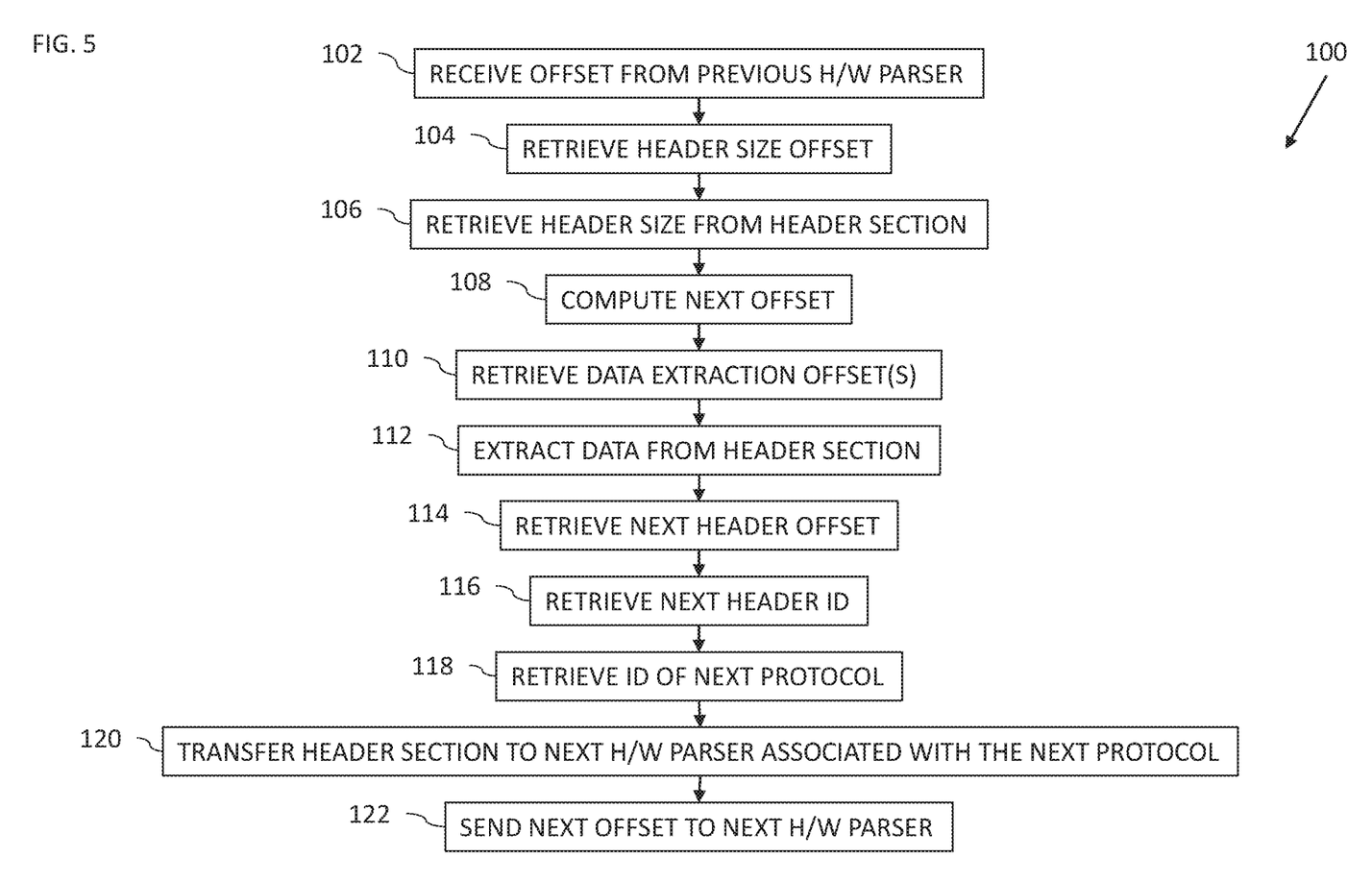
FIG. 5 is a flowchart including steps in a parsing method of the device of FIG. 1.

Reference is now made to FIG. 5, which is a flowchart 100 including steps in a parsing method of the device 10 of FIG. 1. Reference is also made to FIG. 4. The method is described with reference to flexible hardware parser 40-1 for the sake of clarity. However, the method may be applied to any of the flexible hardware parsers 40.

The flexible hardware parser 40-1 is configured to receive (block 102) the absolute offset (from the beginning of the header section) where the previous hardware parser 40, 42 completed parsing from the previous hardware parser 40, 42. If the flexible hardware parser 40-1 is the first parser to parse the header section, the flexible hardware parser 40-1 does not receive any offset and assumes that the offset is zero. The offset is used in the parsing process described below. Therefore, respective ones of the hardware parsers 40, 42 are configured to successively parse the header section according to respective offsets in the header section.

The flexible hardware parser 40-1 is configured to retrieve (block 104) the header size offset from the header size offset field 52 (FIG. 4) and optionally the mask data from the header size mask field 54 (FIG. 4). The flexible hardware parser 40-1 is configured to retrieve (block 106) the header size from the header size (relative) offset in the header. The flexible hardware parser 40-1 is configured to compute (block 108) an offset for passing to the next hardware parser 40, 42 responsively to the retrieved header size and the offset received in the step of block 102. The computed offset provides the offset of the last bit in this header. Therefore, the flexible hardware parser 40-1 is configured to compute the offset responsively to the header size offset field 52 (and optionally header size mask field 54) of the parsing configuration data and the header size from the header section, and the offset received in the step of block 102. The computed offset may be saved in the buffer 16 and/or passed on to the packet processing engine 20 in addition to being passed on to the next hardware parser 40, 42.

As mentioned above, the data subset 50 of the parsing configuration data set 48 for the flexible hardware parser 40-1 includes data extraction offset field 64 identifying an offset(s) in the header section from which data is to be extracted. The flexible hardware parser 40-1 is configured to retrieve (block 110) the offset(s) from the data extraction offset field 64, and extract data (block 112) from the header of the header section responsively to the data extraction offset(s). The extracted data may be saved in the buffer 16 and/or passed on to the packet processing engine 20.

As mentioned above, the data subset 50 for the flexible hardware parser 40-1 includes: the next header offset field 58 providing the next header offset of the next header identification (ID) in the header of the header section; and the next protocol table 62 linking next header IDs with next protocols. The flexible hardware parser 40-1 is coupled to retrieve (block 114) the next header offset from the data subset 50 for the flexible hardware parser 40-1 in the parser configuration registers 24 (FIG. 1). The flexible hardware parser 40-1 is coupled to retrieve (block 116) the next header ID, which is located in the header of the header section at the next header offset, from the header section responsively to the retrieved next header offset. The flexible hardware parser 40-1 is coupled to retrieve (block 118) an identification of a next protocol to be processed from the next protocol table 62 of the data subset 50 for the flexible hardware parser 40-1 in the parser configuration registers 24 (FIG. 1) responsively to the retrieved next header ID. The flexible hardware parser 40-1 is coupled to transfer (block 120) the header section to one of the hardware parsers 40, 42, which is configured to parse the next header of the header section in accordance with the next protocol. The identification of the next protocol provides the identification of the connection 44 over which the flexible hardware parser 40-1 is connected to the next hardware parser 40, 42. The flexible hardware parser 40-1 is coupled to send (block 122) the offset computed in the step of block 108 to the next hardware parser 40, 42. The steps of blocks 102-122 are repeated by the next hardware parser 40, and so on.

Figure 6:
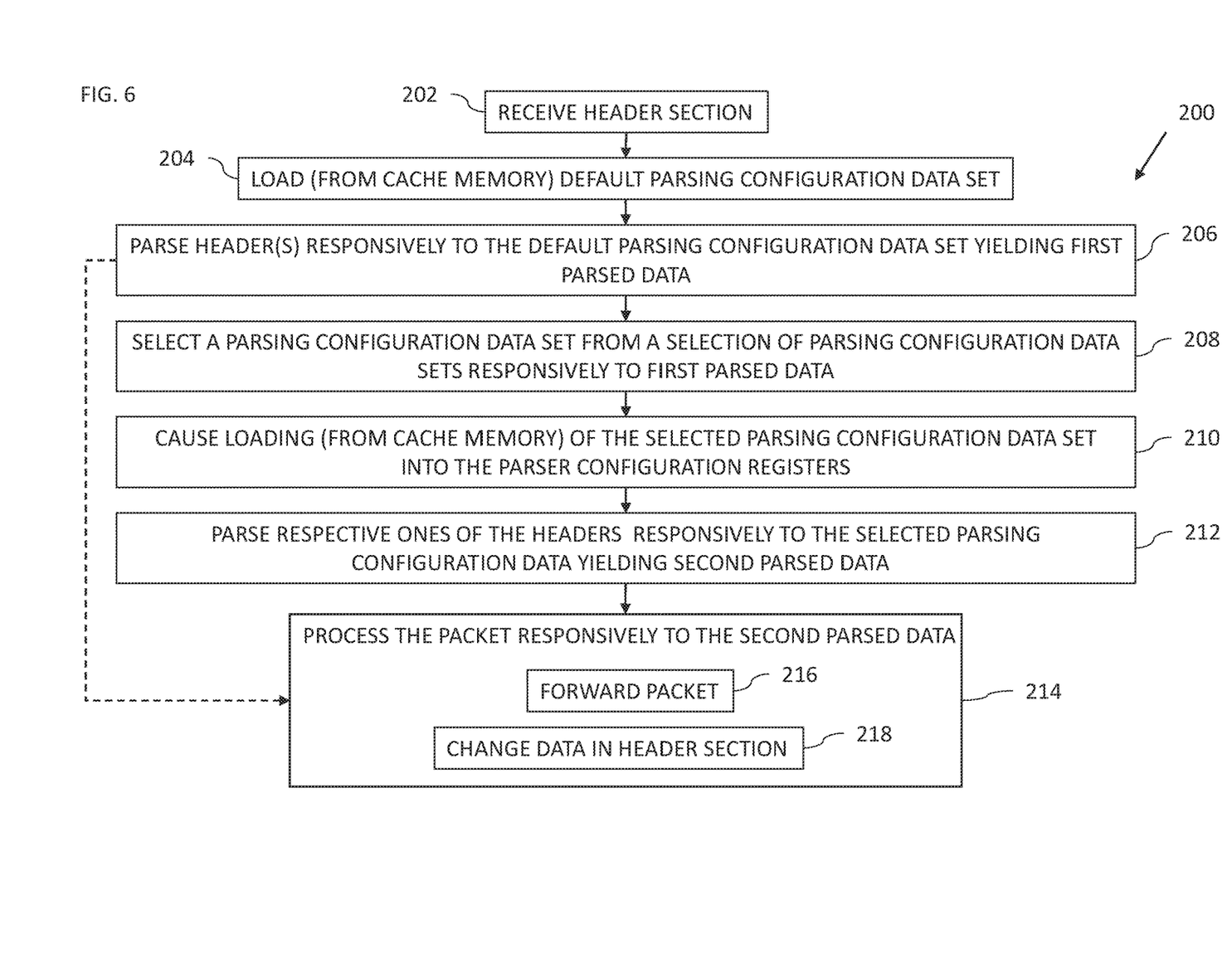
FIG. 6 is a flowchart including steps in a method of operation of the device of FIG. 1.

Reference is now made to FIG. 6, which is a flowchart 200 including steps in a method of operation of the device 10 of FIG. 1. Reference is also made to FIG. 1.

The hardware parsers 18 are coupled to receive (block 202) data of a header section of a packet. The header section includes respective headers. In some embodiments, the controller 22 is configured to select packets from the buffer 16 and load the packets into the hardware parsers 18 for parsing by the hardware parsers 18.

The controller 22 is configured to load (block 204) a default parsing configuration set into the parser configuration registers 24 from the selection of parsing configuration data sets 32 cached in the cache memory 26. The parser configuration registers 24 are configured to store the default parsing configuration data set.

One of the hardware parsers 40, 42 may be defined as an initial parser to receive the header section for parsing. The initial parser may be fixed or may be configurable according to the data stored in the parser configuration registers 24.

At least one of the hardware parsers 40, 42 is configured to parse (block 206) at least one of the headers of the header section responsively to the default parsing configuration data set, yielding first parsed data. The default parsing configuration data set may be populated so that one or more of the flexible hardware parsers 40 and/or one or more of the native hardware parsers 42 parse at least part of the header section, e.g., the MAC header is parsed by one of the native hardware parsers 42 (e.g., a MAC hardware parser). For example, the default parsing configuration data set may include data such that there is no next header after the MAC parser leading the parsing to complete after the MAC parser completes parsing.

The packet processing engine 20 is coupled to the hardware parsers 18, The packet processing engine 20 is configured to select (block 208) a parsing configuration data set from the selection of parsing configuration data sets 32 responsively to the first parsed data, for example, using the match and action tables 28. The packet processing engine 20 is configured to cause loading (block 210) of the selected parsing configuration data set from the cache memory 26 into the parser configuration registers 24. The packet processing engine 20 typically sends a command to the controller 22, which is configured to load the selected parsing configuration set into the parser configuration registers 24 from the cache memory 26.

Typically, under control of the controller 22, the hardware parsers 40, 42 are configured to parse (block 212) the same header section again according to the selected parsing configuration data. The hardware parsers 40, 42 are configured to parse respective ones of the headers of the header section responsively to the selected parsing configuration data set, yielding second parsed data. It should be noted that each header is parsed by one of the hardware parsers 40, 42, even though one of the hardware parsers 40, 42 may parse two or more headers, e.g., two MAC headers when tunneling is used.

The packet processing engine 20 is configured to process (block 214) the packet responsively to the second parsed data, for example, using the match and action tables 28. The processing may include any suitable processing including the examples provided above with reference to FIG. 1 and below. The packet processing engine 20 may be configured to forward (block 216) the packet via the communication bus interface 30 to a virtual machine running on the server 34 or via an egress port of the network interface 12 to the network node 36 in the packet data network 14 responsively to the second parsed data. The packet processing engine 20 is configured to change data (block 218) in the header section responsively to the second parsed data.

By way of example, the parsing function of the network device 10 may be shared among different VNFs each having different parsing requirements. In a virtualized environment where there are multiple VNFs running over the network device 10 (e.g., a network interface card), each VNF may have its own parsing scheme requirements (e.g. a proprietary header that needs to be parsed for a particular VNF). One example for a VNF is a User Plane Function (UPF) that has to parse General Packet Radio Service (GPRS) tunneling protocol (GTP) headers. Assuming, the VNF is running over a VXLAN virtualized environment, the default parser configuration would parse the VXLAN header of a packet. A rule in the match and action tables 28 would identify the correct VNF based on the initial parse of the outer header of the packet. After identifying the VNF, the packet processing engine 20 strips the outer header from the header section of the packet and instructs the controller 22 to load the parsing configuration set for that VNF into the parser configuration registers 24 to parse the GTP header. Another VNF using the same network device 10 may include a firewall that performs Internet Protocol Security (IPSEC). In this case, identifying the VNF from the packet header leads to the parsing configuration set for that VNF to be loaded into the parser configuration registers 24 to support IPSEC parsing.

Therefore, the hardware parsers 40, 42 are configured to parse header sections of respective virtual network functions (VNFs) having respective header parsing schemes responsively to respective ones of the selection of parsing configuration data sets 32. The packet processing engine 20 may be configured to identify a first VNF of the VNFs from a network address included in the first parsed data. The step of block 208 may include the packet processing engine 20 being configured to select the selected parsing configuration data set from the selection of parsing configuration data sets 32 responsively to the first parsed data being identified as associated with the first VNF. The step of block 212 may include hardware parsers 40, 42 being configured to parse respective headers in accordance with the header parsing scheme of the first VNF responsively to the selected parsing configuration data set of the first VNF, yielding second parsed data. The step of block 214 may include the packet processing engine 20 being configured to forward the packet responsively to the second parsed data, for example, to a virtual machine of the first VNF.

In accordance with another example, the number of hardware parsers 18 limits the number of protocols that can be supported without selectively loading different ones of the selection of parsing configuration data sets 32 into the parser configuration registers 24. For example, the default parsing configuration data set is not configured to support a VXLAN header. Upon reaching the UDP header in the initial parsing stage, the UDP destination port is extracted and parsing is stopped. The packet processing engine 20 uses the match and action tables 28 to look up the UDP destination port. If the UDP destination port indicates VXLAN, the controller 22 loads the parsing configuration data set that supports VXLAN parsing into the parser configuration registers 24 and instructs the flexible hardware parsers 40 to reparse the header section accordingly.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A network device, comprising:
   hardware parsers coupled to receive data of a header section of a packet, the header section including respective headers;
   parser configuration registers configured to store a default parsing configuration data set, wherein at least one of the hardware parsers is configured to parse at least one of the headers responsively to the default parsing configuration data set, yielding first parsed data;
   a packet processing engine coupled to the hardware parsers, and configured to:
      select a virtual machine (VM) parsing configuration data set from a selection of VM parsing configuration data sets of respective VMs having respective header parser schemes, responsively to the first parsed data being identified as being associated with a given one of the VMs;
      cause loading of the selected VM parsing configuration data set into the parser configuration registers, and wherein ones of the hardware parsers are configured to parse respective ones of the headers in accordance with a respective one of the header parsing schemes of the given VM responsively to the selected VM parsing configuration data set, yielding second parsed data; and
      process the packet responsively to the second parsed data.

2. The device according to claim 1, further comprising an interface configured as an egress port, wherein the packet processing engine is configured to forward the packet via the egress port to a network node in a packet data network responsively to the second parsed data.

3. The device according to claim 1, wherein the packet processing engine is configured to change data in the header section responsively to the second parsed data.

4. The device according to claim 1, further comprising a cache memory configured to cache the selection of VM parsing configuration data sets including the selected VM parsing configuration data set, the packet processing engine being configured to cause loading of the selected VM parsing configuration data set from the cache memory into the parser configuration registers.

5. The device according to claim 1, wherein:
the hardware parsers are configured to parse header sections of respective virtual network functions (VNFs) having respective header parsing schemes responsively to respective ones of the selection of VM parsing configuration data sets;
the packet processing engine is configured to select the selected VM parsing configuration data set from the selection of VM parsing configuration data sets responsively to the first parsed data being identified as associated with one of the VNFs;
ones of the hardware parsers are configured to parse respective ones of the headers in accordance with one of the header parsing schemes of the one VNF responsively to the selected VM parsing configuration data set; and
the packet processing engine is configured to forward the packet responsively to the second parsed data.

6. The device according to claim 5, wherein respective ones of the VNFs include at least one virtual machine.

7. The device according to claim 6, wherein the packet processing engine is configured to forward the packet to a virtual machine responsively to the second parsed data.

8. The device according to claim 6, wherein the packet processing engine is configured to identify the one VNF from a network address included in the first parsed data.

9. The device according to claim 1, wherein respective ones of the hardware parsers are configured to successively parse the header section according to respective offsets in the header section, ones of the hardware parsers being configured to compute the respective offsets responsively to the selected VM parsing configuration data and the header section.

10. The device according to claim 9, wherein the selected VM parsing configuration data set includes for respective ones of the hardware parsers: a next header offset of a next header identification (ID) in the header section; and a next protocol table linking next header IDs with next protocols, wherein a first one of the hardware parsers is coupled to:
retrieve the next header offset for the first hardware parser from the selected VM parsing configuration data set in the parser configuration registers;
retrieve the next header ID, which is located in the header section at the next header offset, from the header section responsively to the retrieved next header offset;
retrieve an identification of a next protocol to be processed from the next protocol table for the first hardware parser from the selected VM parsing configuration data set in the parser configuration registers responsively to the retrieved next header ID; and
transfer the header section to a second one of the hardware parsers, which is configured to parse the header section in accordance with the next protocol.

11. The device according to claim 9, wherein the selected VM parsing configuration data set includes for respective ones of the hardware parsers, at least one data extraction offset in the header section for which data is to be extracted, a first one of the hardware parsers being configured to extract data from the header section responsively to the at least one data extraction offset of the first hardware parser in the selected VM parsing configuration data set.

12. A network method, comprising:
receiving data of a header section of a packet, the header section including respective headers;
storing a default parsing configuration data set in parser configuration registers;
parsing at least one of the headers responsively to the default parsing configuration data set, yielding first parsed data;
selecting a virtual machine (VM) parsing configuration data set from a selection of VM parsing configuration data sets of respective VMs having respective header parsing schemes, responsively to the first parsed data being identified as being associated with a given one of the VMs;
causing loading of the selected VM parsing configuration data set into the parser configuration registers;
parsing respective ones of the headers in accordance with a respective one of the header parser schemes of the given VM responsively to the selected VM parsing configuration data set, yielding second parsed data; and
processing the packet responsively to the second parsed data.

13. The method according to claim 12, further comprising forwarding the packet via an egress port to a network node in a packet data network responsively to the second parsed data.

14. The method according to claim 12, further comprising changing data in the header section responsively to the second parsed data.

15. The method according to claim 12, further comprising: caching the selection of VM parsing configuration data sets including the selected VM parsing configuration data set in a cache memory; and cause loading of the selected VM parsing configuration data set from the cache memory into the parser configuration registers.

16. The method according to claim 12, further comprising:
parsing header sections of respective virtual network functions (VNFs) having respective header parsing schemes responsively to respective ones of the selection of VM parsing configuration data sets;
selecting the selected VM parsing configuration data set from the selection of VM parsing configuration data sets responsively to the first parsed data being identified as associated with one of the VNFs;
parsing respective ones of the headers in accordance with one of the header parsing schemes of the one VNF responsively to the selected VM parsing configuration data set; and
forwarding the packet responsively to the second parsed data.

17. The method according to claim 16, wherein respective ones of the VNFs include at least one virtual machine.

18. The method according to claim 17, further comprising forwarding the packet to a virtual machine responsively to the second parsed data.

19. The method according to claim 17, further comprising identifying the one VNF from a network address included in the first parsed data.

20. The method according to claim 12, further comprising:
successively parsing the header section according to respective offsets in the header section; and
computing the respective offsets responsively to the selected VM parsing configuration data set and the header section.

21. The method according to claim 20, wherein the selected VM parsing configuration data set includes: a next header offset of a next header identification (ID) in the header section; and a next protocol table linking next header IDs with next protocols, the method further comprising:

retrieving the next header offset from the selected VM parsing configuration data set;

retrieving the next header ID, which is located in the header section at the next header offset, from the header section responsively to the retrieved next header offset;

retrieving an identification of a next protocol to be processed from the next protocol table from the selected VM parsing configuration data set responsively to the retrieved next header ID; and parsing the header section in accordance with the next protocol.

22. The method according to claim 20, wherein the selected VM parsing configuration data set includes at least one data extraction offset in the header section for which data is to be extracted, the method further comprising extracting data from the header section responsively to the at least one data extraction offset of the first hardware parser in the selected VM parsing configuration data set.

\* \* \* \* \*